3,475,455
1-(3',4',METHYLENEDIOXYPHENOXY)-2-AMINO ALKANES

Otto Thoma, Herbert Koppe, Anton Mentrup, and Karl Zeile, Ingelheim am Rhein, and Gerhard Ludwig, Wedel, Germany, assignors to C. H. Boehringer Sohn, Ingelheim am Rhein, Germany, a corporation of Germany
No Drawing. Continuation-in-part of application Ser. No. 681,582, Nov. 8, 1967, which is a continuation-in-part of application Ser. No. 448,881, Apr. 16, 1965. This application June 10, 1968, Ser. No. 735,564
Claims priority, application Great Britain, Apr. 20, 1964, 16,202/64; Netherlands, Nov. 18, 1966, 6616293
Int. Cl. C07d 13/10; A61k 27/00
U.S. Cl. 260—340.5                6 Claims

ABSTRACT OF THE DISCLOSURE

Novel-1-phenoxy-2-amino-alkanes of the formula

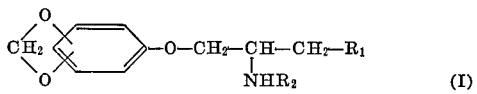

(I)

wherein $R_1$ is selected from the group consisting of hydrogen and alkyl of 1 to 3 carbon atoms and $R_2$ is selected from the group consisting of hydrogen and alkyl of 1 to 4 carbon atoms and their optical antipodes and their non-toxic, pharmaceutically acceptable acid addition salts which compounds are useful for curbing appetites of warm-blooded animals.

PRIOR APPLICATION

This application is a continuation-in-part application of our copending, commonly assigned patent application Ser. No. 681,582 filed Nov. 8, 1967, which in turn is a continuation-in-part application of U.S. application Ser. No. 448,881, filed Apr. 16, 1965, now abandoned.

OBJECTS OF THE INVENTION

It is an object of the invention to provide the novel 1-phenoxy-2-amino-alkanes of Formula I and their acid addition salts.

It is another object of the invention to provide novel anorexigenic compositions.

It is a further object of the invention to provide a novel method of curbing appetites of warm-blooded animals.

These and other objects and advantages of the invention will become obvious from the following detailed description.

THE INVENTION

The novel 1-phenoxy-2-amino-alkanes of the invention are selected from the group consisting of compounds of the formula

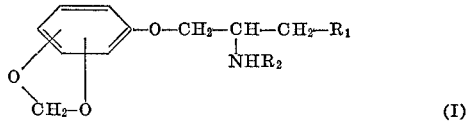

(I)

wherein $R_1$ is selected from the group consisting of hydrogen and alkyl of 1 to 3 carbons and $R_2$ is selected from the group consisting of hydrogen and alkyl of 1 to 4 carbon atoms, and their optical antipodes, and their non-toxic, pharmaceutically acceptable acid addition salts.

Since the compounds of the Formula I possess an asymmetrically-substituted carbon atom, they accur as racemic mixtures, which may be separated into their optical antipodes by conventional methods.

The compounds embraced by Formula I above are bases and, therefore, form acid addition salts and especially non-toxic, pharmacologically acceptable acid addition salts with inorganic or organic acids. Such acid addition salts may be prepared by conventional methods, such as by dissolving the free base compound in a suitable solvent and acidifying the solution with the desired acid. Examples of non-toxic pharmacologically acceptable acid addition salts of the compounds of the Formula I are those formed with hydrochloric acid, hydrobromic acid, phosphoric acid, sulfuric acid, acetic acid, tartaric acid, citric acid, succinic acid, malic acid, maleic acid, 2-furoic acid, 8-chlorotheophylline and the like.

The phenoxy-2-amino-alkanes of Formula I may be prepared by a variety of methods as illustrated by the following methods.

METHOD A

By subjecting a pheonoxy-alkanone of the formula

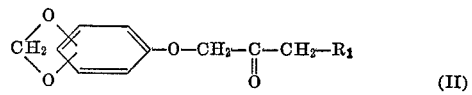

(II)

wherein $R_1$ has the definition of Formula I to catalytic reduction, preferably with a nickel or platinum catalyst, in the presence of a nitrogen compound of the formula $$NH_2\text{—}R_2 \qquad (III)$$

wherein $R_2$ has the definition of Formula I.

METHOD B

By subjecting aphenoxy-alkanone of the Formula II, wherein $R_1$ has the definition of Formula I, to reductive amination with a hydride, preferably with a complex metal hydride such as sodium borohydride, in the presence of a nitrogen compound of the Formula III.

METHOD C

By reacting a phenoxy-alkanone of the Formula II, wherein $R_1$ has the definition of Formula I with a nitrogen compound of the Formula III in the presence of formic acid, for instance, by using a formic acid salt or a formyl compound of the nitrogen compound III.

The phenoxy-alkanones II used as starting materials in Methods A through C may themselves be prepared according to conventional methods, such as from alkali metal phenolates and α-haloalkanones.

METHOD D

By subjecting an oxide of the formula

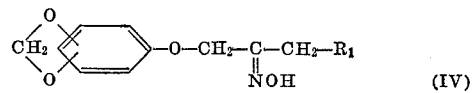

(IV)

wherein $R_1$ has the same meaning as in Formula I to catalytic reduction, preferably with a nickel or cobalt catalyst, and subsequent monoalkylation of the free amino group to introduce the substituent $R_2$, if desired by conventional methods.

METHOD E

By reducing an oxime of the Formula IV, wherein $R_1$ has the definition of Formula I, with a hydride, preferably with a complex metal hydride such as lithium aluminum hydride, and subsequent alkylation of the amino group, if desired.

The oximes IV used as starting materials in Methods D and E may themselves be prepared by known methods, preferably by reacting a phenoxy-alkanone II with hydroxylamine.

METHOD F

By subjecting an imine or Schiff's base of the formula

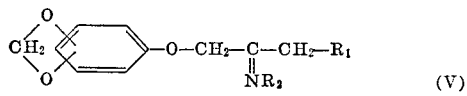

wherein $R_1$ and $R_2$ have the same meanings as in Formula I to a catalytic reduction, preferably with a nickel, platinum or palladium catalyst.

METHOD G

By reducing an imine or Schiff's base of the Formula V, wherein $R_1$ and $R_2$ have the definitions of Formula I, with a hydride, preferably with a complex metal hydride such as sodium borohydride.

The starting compounds of the Formula V for Methods F and G may themselves be prepared by known methods, such as by reacting a phenoxy-alkanone of the Formula II with a nitrogen compound of the Formula III, and need not be isolated from the reaction mixture prior to use in the reduction reactions of Methods F and G.

METHOD H

By reacting a 1-phenoxy-2-halo-alkane of the formula

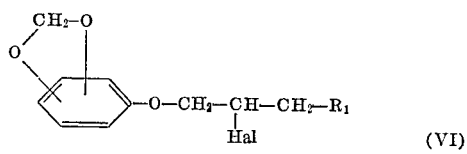

where $R_1$ has the definition of Formula I and Hal is halogen, with a nitrogen compound of the Formula III wherein all but one of the hydrogen atoms are preferably replaced by a protective group, such as benzyl, phthalyl and toluene-sulfonyl, which is readily removable by reduction or hydrolysis subsequent to the reaction.

In those cases where the above Methods A through H yield compounds of the Formula I where $R_2$ is hydrogen, the free amino group may subsequently be mono-alkylatedd by conventional methods.

The compounds according to the present invention have useful pharmacological properties. More particularly, they exhibit a strong anorexigenic activity coupled with very low central stimulating activity in warm-blooded animals, such as mice and rats.

The novel anorexigenic compositions without any appreciable central nervous system stimulating activity of the invention are comprised of at least one compound selected from the group consisting of 1-phenoxy-2-amino-alkanes of the formula

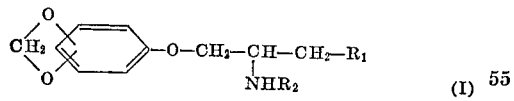

wherein $R_1$ is selected from the group consisting of hydrogen and alkyl of 1 to 3 carbon atoms and $R_2$ is selected from the group consisting of hydrogen and alkyl of 1 to 4 carbon atoms and their optical antipodes and their non-toxic, pharmaceutically acceptable acid addition salts and a major amount of a pharmaceutical carrier.

For pharmaceutical purposes the compounds of the invention, that is, those embraced by Formula I, their optical antipodes and non-toxic acid addition salts of the racemic compounds and of the optical antipodes are administered by the peroral or parenteral route, the peroral route being preferred, to warm-blooded animals as active ingredients in conventional dosage unit compositions, i.e., compositions consisting essentially of an inert pharmaceutical carrier and one dosage unit of the active ingredient, such as tablets, coated pills, powders, suspensions, solutions, suppositories, capsules and the like. One dosage unit of the compounds used as active ingredients in accordance with the present invention is from 10 to 150 mgm., preferably 20 to 100 mgm.

The novel method of the invention for curbing appetities in warm-blooded animals comprises administering to warm-blooded animals an anorexigenic effective amount of at least one compound selected from the group consisting of 1-phenoxy-2-amino-alkanes of the formula

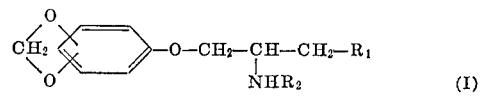

wherein $R_1$ is selected from the group consisting of hydrogen and alkyl of 1 to 3 carbon atoms and $R_2$ is selected from the group consisting of hydrogen and alkyl of 1 to 4 carbon atoms and their optical antipodes and their non-toxic, pharmaceutically acceptable acid addition salts. The usual effective dose of the said compounds is 0.016 to 5 mg./kg., preferably 0.16 to 2.5 mg./kg. of body weight of the warm-blooded animals. In the following examples there are described several preferred embodiments to illustrate the invention. However, it should be understood that the invention is not intended to be limited to the specific embodiments.

EXAMPLE I

Preparation of 1-(3′,4′-methylenedioxy-phenoxy)-2-amino-propane and its hydrochloride 10.5 gm. (0.05 mol) of 1-(3′,4′-methylenedioxyphenoxy)-acetonoxime were dissolved in 100 cc. of methanol and the solution was hydrogenated at 40° C. and 5 atmospheres with Raney nickel as a catalyst. After the theoretical amount of hydrogen had been adsorbed, the reaction mixture was filtered to remove the catalyst, and the methanol was distilled off in vacuo. The oily residue, raw 1 - (3′,4′ - methylenedioxy - phenoxy)-2-amino-propane, was admixed with ethereal hydrochloric acid, and the precipitate formed thereby was separated by vacuum filtration and recrystallized from a mixture of methanol and ether. 7.5 gm. of a substance having a melting point of 197–198° C. were obtained. It was identified to be 1 - (3′,4′-methylenedioxy-phenoxy)-2-aminopropane hydrochloride of the formula

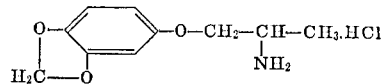

EXAMPLE II

Using the procedure of Example I, 1-(3′,4′-methylenedioxyphenoxy)-2-methylamino - propane hydrochloride having a melting point of 150–152° C. was obtained.

EXAMPLE III

Using the procedure of Example I, 1-(3′,4′-methylenedioxyphenoxy) - 2 - ethylamino-propane hydrochloride having a melting point of 174° C. was obtained.

EXAMPLE IV

Using the procedure of Example I, 1-(3′,4′-methylenedioxyphenoxy) - 2 - propylamino-propane hydrochloride having a melting point of 126–128° C. was obtained.

EXAMPLE V

Using the procedure of Example I, 1-(3′,4′-methylenedioxyphenoxy) - 2 - isopropylamino-propane hydrochloride having a melting point of 149–150° C. was obtained.

PHARMACEUTICAL EXAMPLES

Example A

| | Mg. |
|---|---|
| 1-(3',4' - methylenedioxyphenoxy) - 2 - methyl-amino-propane hydrochloride | 75.0 |
| Lactose | 25.0 |
| Sec. calcium phosphate | 150.0 |
| Cornstarch | 206.0 |
| Colloidal silicic acid | 12.0 |
| Stearic acid | 4.0 |
| Soluble starch | 8.0 |
| Total | 480.0 |

Preparation: The mixture of the active substance was granulated in the usual manner with the adjuvants, supporting agents and lubricants and compressed into tablets.

Example B (tablets)

| | Mg. |
|---|---|
| 1-(3',4' - methylenedioxyphenoxy) - 2 - isopropyl-amino propane hydrochloride | 100.0 |
| Sec. calcium phosphate | 150.0 |
| Collodial silicic acid | 206.0 |
| Magnesium stearate | 4.0 |
| Soluble starch | 8.0 |
| Total | 480.0 |

Preparation: The mixture of the active substance was granulated in the usual manner with the adjuvants, supporting agents and lubricants and compressed into tablets.

Example C (dragees)

| | Mg. |
|---|---|
| 1-(3',4' - methylenedioxyphenoxy) - 2 - ethyl-amino-propane hydrochloride | 60.0 |
| Sec. calcium phosphate | 135.0 |
| Corn starch | 91.0 |
| Colloidal silicic acid | 7.0 |
| Stearic acid | 4.0 |
| Polyvinylpyrrolidone | 3.0 |
| Total | 300.0 |

Preparation: The mixture of the active substance was granulated in the usual manner with adjuvants, supporting agents and lubricants and compressed into tablets.

(b) Coating:

| | |
|---|---|
| Polyvinylpyrrolidone | 2.0 |
| Talcum | 50.0 |
| Titanium dioxide | 3.0 |
| Gum arabic | 4.0 |
| Sugar | 71.0 |
| Total | 430.0 |

Preparation: The mixture was suspended in an appropriate solvent, for example water, and applied to the core by means of a spray gun.

Example D (capsules)

A mixture consisting of 80 parts of 1-(3',4'-methylenedioxyphenoxy)-2-amino-propane hydrochloride and 120 parts of cornstarch was filled into hard gelatine capsules.

Example E (depot-dragees)

100 gm. of 1-(3',4'-methylenedioxyphenoxy)-2-methyl-amino-propane sulfate were admixed with 295 gm. of carboxymethylcellulose and 20 gm. of stearic acid and kneaded thoroughly with a solution of 40 gm. of cellulose acetatephthalate in 200 ml. of a mixture of ethanol/ethyl-acetate (1:1) and granulated. From this granulate drageé kernels were pressed in the usual manner, which then were coated with the aid of a sugar containing 5% polyvinyl-pyrrolidone-suspension in water.

PHARMACOLOGICAL DATA

Using the test procedures of J. Spengler and P. Waser in Arch. exptl. Path u. Pharmakol. 237, 171 (1959), resp. G. Kärber, Arch., exptl. Path. u. Pharmakol. 162, 480 (1931), the compounds of the following table were compared with 2-phenyl-3,4-dimethyl-morpholine hydrochloride (a known appetite curber) for the curbing of food intake $F-ED_{50}$ on rats and for their central nervous system excitation activity $(Z-ED_{50})$ and toxicity $(LD_{50})$ mice. The results are reported in Table I.

TABLE I

| | $F-ED_{50}$, mg./kg. | $Z-ED_{50}$, mg./kg. | $LD_{50}$, mg./kg. | $Z-ED_{50}/F-ED_{50}$ |
|---|---|---|---|---|
| 1-(3',4'-methylenedioxyphenoxy)-2-amino-propane. HCl | 13.0 | | 210 | |
| 1-(3',4'-methylenedioxyphenoxy)-2-methylaminopropane. HCl | 18.0 | 155 | 290 | 8.6 |
| Known compound | 19.0 | 38.5 | 230 | 2.0 |

As can be seen from Table I, the compounds of the invention possess an excellent appetite curbing activity with a very low central nervous system stimulating activity. The therapeutic index $(Z-ED_{50})/(F-ED_{50})$ is 3 to 5 times greater for the compounds of the invention than that of the known appetite curber.

Various modifications of the compositions and method of the invention may be made without departing from the spirit of scope thereof.

We claim:

1. A 1-(3',4'-methylenedioxyphenoxy)-2-amino alkane selected from the group consisting of a compound having the formula

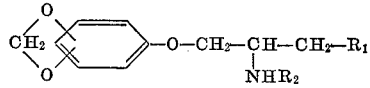

wherein $R_1$ is selected from the group consisting of hydrogen and alkyl of 1 to 3 carbon atoms and $R_2$ is selected from the group consisting of hydrogen and alkyl of 1 to 4 carbon atoms and their optical antipodes, and their non-toxic, pharmaceutically acceptable acid addition salts.

2. A compound of claim 1 selected from the group consisting of 1-(3',4'-methylenedioxyphenoxy)-2-amino-propane, its optical antipodes and its non-toxic, pharmaceutically acceptable acid addition salts.

3. A compound of claim 1 selected from the group consisting of 1-(3',4'-methylenedioxyphenoxy)-2-methyl-amino-propane, its optical antipodes and its non-toxic, pharmaceutically acceptable acid addition salts.

4. A compound of claim 1 selected from the group consisting of 1-(3',4'-methylenedioxyphenoxy)-2-ethyl-amino-propane, its optical antipodes and its non-toxic, pharmaceutically acceptable acid addition salts.

5. A compound of claim 1 selected from the group consisting of 1-(3',4'-methylenedioxyphenoxy)-2-propyl-amino-propane, its optical antipodes and its non-toxic, pharmaceutically acceptable acid addition salts.

6. A compound of claim 1 selected from the group consisting of 1-(3',4'-methylenedioxyphenoxy) - 2 - iso-propylamino-propane, its optical antipodes and its non-toxic, pharmaceutically acceptable acid addition salts.

References Cited

UNITED STATES PATENTS 2,953,494  9/1960  Cook et al. _____ 260—340.5
2,974,148  3/1961  Cook et al. _____ 260—340.5

NICHOLAS S. RIZZO, Primary Examiner

J. H. TURNIPSEED, Assistant Examiner

U.S. Cl. X.R.

424—282